US008993181B2

(12) United States Patent
Takeshita (10) Patent No.: US 8,993,181 B2
(45) Date of Patent: Mar. 31, 2015

(54) VALVE FOR FUEL CELL, AND FUEL CELL VEHICLE

(75) Inventor: Masahiro Takeshita, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 400 days.

(21) Appl. No.: 13/357,925

(22) Filed: Jan. 25, 2012

(65) Prior Publication Data

US 2012/0122005 A1 May 17, 2012

Related U.S. Application Data

(62) Division of application No. 12/445,493, filed as application No. PCT/JP2007/072048 on Nov. 7, 2007.

(30) Foreign Application Priority Data

Dec. 8, 2006 (JP) ................................. 2006-331304

(51) Int. Cl.
*H01M 8/22* (2006.01)
*H01M 8/00* (2006.01)
(Continued)

(52) U.S. Cl.
CPC ......... *H01M 8/04089* (2013.01); *F16K 31/126* (2013.01); *Y02E 60/50* (2013.01)
USPC ........... 429/407; 429/400; 429/403; 429/512; 137/493; 137/493.7; 137/493.9; 137/515; 137/625

(58) Field of Classification Search
USPC ............ 429/400, 403, 407, 512, 34; 137/351, 137/515, 355.17, 384.2, 493.7, 493.8, 137/493.9, 495, 508, 596, 596.1, 597, 625, 137/899, 899.4
See application file for complete search history.

(56) References Cited

U.S. PATENT DOCUMENTS 3,689,025 A 9/1972 Kiser
3,800,765 A 4/1974 Thompson
(Continued)

FOREIGN PATENT DOCUMENTS

JP 4-220703 A 8/1992
JP 7-310852 A 11/1995
(Continued)

OTHER PUBLICATIONS

Office Action issued May 8, 2012 in JP 2006-331304 and English translation thereof.
(Continued)

*Primary Examiner* — Patrick Ryan
*Assistant Examiner* — Aaron Greso
(74) *Attorney, Agent, or Firm* — Kenyon & Kenyon LLP (57) ABSTRACT

A valve-closing pressure chamber and a valve-opening pressure chamber are arranged on both sides of a main diaphragm inside an outlet shutoff valve. An upper supply/discharge tube and a lower supply/discharge tube are connected to a housing forming the outlet shutoff valve. The upper and lower supply/discharge tube supply and discharge air to and from the valve-closing pressure chamber and the valve-opening pressure chamber, respectively. An opening end, which is on the pressure chamber side, of each supply/discharge tube is obliquely cut relative to the direction of axis of the supply/discharge tube, which increases the opening area of the opening end. This prevents water present in the pressure chamber from adhering to the opening end of each supply/discharge tube and prevents the adhered water from freezing. As a result, operation performance of the outlet shutoff valve is enhanced.

5 Claims, 6 Drawing Sheets

(51) Int. Cl.
  *H01M 8/04* (2006.01)
  *F16K 17/26* (2006.01)
  *F16K 15/00* (2006.01)
  *F16K 17/00* (2006.01)
  *F16K 21/04* (2006.01)
  *A01G 25/16* (2006.01)
  *F16K 31/126* (2006.01)

(56) References Cited

U.S. PATENT DOCUMENTS

| | | |
|---|---|---|
| 3,882,883 A | 5/1975 | Droegemueller |
| 4,052,969 A | 10/1977 | Ando et al. |
| 4,553,470 A | 11/1985 | Shimazu |
| 5,002,086 A | 3/1991 | Linder et al. |
| 5,829,473 A * | 11/1998 | Hajbi et al. ............... 137/315.28 |
| 6,095,484 A | 8/2000 | Frenkel |
| 7,192,003 B2 | 3/2007 | Hoobyar et al. |
| 7,878,479 B2 | 2/2011 | Yamamoto |
| 2006/0024542 A1* | 2/2006 | Uozumi et al. ............... 429/22 |
| 2006/0251946 A1* | 11/2006 | Makuta et al. ............... 429/34 |
| 2006/0254906 A1* | 11/2006 | Numata et al. ............... 204/258 |
| 2007/0141419 A1* | 6/2007 | Lee et al. ............... 429/24 |

FOREIGN PATENT DOCUMENTS

| | | | | |
|---|---|---|---|---|
| JP | 9-144611 A | | 6/1997 | |
| JP | 2000-227050 A | | 8/2000 | |
| JP | 2003-507779 | * | 2/2003 | ............ F16K 31/122 |
| JP | 2003-507779 A | | 2/2003 | |
| JP | 2004-183706 A | | 7/2004 | |
| JP | 2004-183713 A | | 7/2004 | |
| JP | 2004-185872 A | | 7/2004 | |
| JP | 2005-30473 A | | 2/2005 | |
| JP | 2005-93104 A | | 4/2005 | |
| JP | 2005-150090 A | | 6/2005 | |
| JP | 2005-183357 A | | 7/2005 | |
| JP | 2006-032134 A | | 2/2006 | |
| JP | 2006-049103 A | | 2/2006 | |
| JP | 2007-148498 A | | 6/2007 | |
| WO | WO 01/13017 | * | 2/2001 | |

OTHER PUBLICATIONS

Office Action issued Sep. 10, 2012 in U.S. Appl. No. 12/445,493.
International Search Report mailed Mar. 11, 2008 in PCT/JP2007/072048.
Office Action issued Mar. 17, 2011 in corresponding CN application No. 200780045362.0 and partial English translation thereof.

* cited by examiner

VALVE FOR FUEL CELL, AND FUEL CELL VEHICLE

This is a division of U.S. application Ser. No. 12/445,493 filed 14 Apr. 2009, which is a 371 national phase application of PCT/JP2007/072048 filed 7 Nov. 2007, claiming priority to Japanese Patent Application No. JP 2006-331304 filed 8 Dec. 2006, the contents of which are incorporated herein by reference.

FIELD OF THE INVENTION

The present invention relates to a fuel cell valve to be used for a fuel cell that generates electricity through an electrochemical reaction between an oxidizing gas and a fuel gas, and a fuel cell vehicle including the fuel cell.

TECHNICAL BACKGROUND

A fuel cell system includes a fuel cell that generates electricity through an electrochemical reaction between a fuel gas and an oxidizing gas (reaction gases), a gas supplying flow path that supplies the reaction gases to the fuel cell, and a gas discharging flow path that discharges the reaction gases from the fuel cell. Open/close valves for the fuel cell can be provided in the gas supplying flow path and the gas discharging flow path.

For example, an open/close valve for a fuel cell discussed in Japanese Unexamined Patent Application Publication No. 2004-183713 includes a valve member having a columnar portion, which is movable in its axial direction to close or open the gas flow path. This open/close valve for a fuel cell includes a diaphragm that divides an inside space into two chambers and is provided at a hydrogen discharging portion where hydrogen exhausted from the fuel cell is discharged. A path branched from an air supplying path, which supplies air to the fuel cell, is connected to one chamber of the two chambers of the open/close valve. A coil spring is provided in the other chamber of the two chambers. The coil spring urges the valve member to open the other chamber and discharge the discharged hydrogen. If air is supplied to one chamber of the valve in an operating state, a pressure acts on the diaphragm to cause the valve member to contact a valve seat against an elastic force of the coil spring while the other chamber is closed.

A pressure regulating valve for a fuel cell discussed in Japanese Unexamined Patent Application Publication No. 2006-49103 is provided upstream in a hydrogen flow path that supplies anode side hydrogen to a fuel cell stack. The pressure regulating valve for a fuel cell includes a diaphragm, which divides an inside space into a pressure regulating chamber and a back-pressure chamber. An upstream side branch flow path, which is branched from an upstream side hydrogen flow path, supplies hydrogen into the back-pressure chamber of the pressure regulating valve.

According to the above-described open/close valve for a fuel cell discussed in Japanese Unexamined Patent Application Publication No. 2004-183713, improvement in view of operability of valve is possible. More specifically, there is a problem (Problem 1) that water may freeze at an inner side edge opening peripheral portion of a valve of an air supply tube connected to an open/close valve. Moreover, there is another problem (Problem 2) that the air supply tube may be broken or deformed in a travelling condition of a fuel cell vehicle that installs a fuel cell system including the open/close valve.

For example, regarding the above-described Problem 1, in the case of the open/close valve for a fuel cell discussed in Japanese Unexamined Patent Application Publication No. 2004-183713, if water vapor is present in the air supplied to one chamber of the two chambers partitioned by the diaphragm, water adheres to an open/close valve inner end portion of the air supply tube if liquefied from the water vapor and may freeze at a low temperature below the freezing point. If the water freezes into ice at an edge portion of the tube that supplies air freezes in this manner, the ice may close the edge portion of the tube and prevent the air from being smoothly supplied or discharged to or from that chamber.

In particular, the air in the one chamber causes large pressure changes between a high pressure and a low pressure according to operations of the valve and therefore causes radical changes in temperature. A large amount of water vapor can be present in the one chamber because it has a relatively large volume compared to the air supply tube. Therefore, the water liquefied from the water vapor tends to adhere to the side edge portion of one chamber. The operational performance of the valve may deteriorate if the adhered water freezes. In this respect, the open/close valve for a fuel cell discussed in Japanese Unexamined Patent Application Publication No. 2004-183713 includes structure capable of preventing water from freezing in the vicinity of the side edge portion of the air supply tube. For example, the air supply tube does not have any edge portion structure capable of preventing the freezing of water.

In the pressure regulating valve discussed in Japanese Unexamined Patent Application Publication No. 2006-49103, hydrogen from the hydrogen tank side is supplied to the back-pressure chamber of the pressure regulating valve. Therefore, no air is introduced into the back-pressure chamber. It is unnecessary, or almost unnecessary, to consider the adhesion of water at a back-pressure chamber side edge portion of the tube connected to the back-pressure chamber. Therefore, the pressure regulating valve discussed in Japanese Unexamined Patent Application Publication No. 2006-49103 has no tube structure capable of preventing the freezing of water at the edge portion of the tube connected to the valve.

In the open/close valve or the pressure regulating valve discussed in Japanese Unexamined Patent Application Publication No. 2004-183713 or Japanese Unexamined Patent Application Publication No. 2006-49103, a connecting portion of the tube (e.g., the air supply tube) is not set to the lowest point on a wall portion of the one chamber or the back-pressure chamber of the two chambers separated by the diaphragm. Therefore, if only one tube is considered, water may not adhere to the edge portion of the tube, compared to the case where the connecting portion of the tube is set to the lowest point of the one chamber or the back-pressure chamber. However, the open/close valve or the pressure regulating valve discussed in Japanese Unexamined Patent Application Publication No. 2004-183713 or Japanese Unexamined Patent Application Publication No. 2006-49103 do not include two pressure chambers, except for the flow path forming pressure chamber constituting a flow path. Therefore, there is no force to caused by a pressure difference between two pressure chambers which can act on a drive shaft of the valve member. For example, other than the chamber and back-pressure chamber partitioned by the diaphragm, the pressure chamber is the only flow path forming pressure chamber constituting a flow path in the open/close valve or the pressure regulating valve discussed in Japanese Unexamined Patent Application Publication No. 2004-183713 or Japanese Unexamined Patent Application Publication No.

2006-49103. As described above, according to the open/close valve or the pressure regulating valve discussed in Japanese Unexamined Patent Application Publication No. 2004-183713 or Japanese Unexamined Patent Application Publication No. 2006-49103, pressure variations caused in the flow path forming pressure chamber due to valve opening/closing operations influence the displacement of the drive shaft. Therefore, improvement of the operability of these valves is possible.

Regarding the above-described Problem 2, in a fuel cell vehicle equipped with a fuel cell system including the fuel cell open/close valve discussed in Japanese Unexamined Patent Application Publication No. 2004-183713 or the pressure regulating valve discussed in Japanese Unexamined Patent Application Publication No. 2006-49103, there is no effective structure capable of preventing the tube connected to the open/close valve from colliding with a foreign object (e.g., snow or a bouncing stone) coming from the front end of the vehicle in motion, and preventing the tube from being deformed (broken or bent). If the tube deforms due to collision with a foreign object, the operational performance of the valve may deteriorate in the same manner as when ice adheres to the tube.

An object of the present invention is to improve, in a valve for a fuel cell and in a fuel cell vehicle, the operational performance of the valve.

DISCLOSURE OF THE INVENTION

The present invention provides a valve for a fuel cell connected to a tubelike member that supplies and discharges fluid to and from a pressure chamber provided in the valve, wherein a pressure chamber side opened end of the tubelike member is obliquely cut with respect to an axial direction of the tubelike member.

The present invention further provides a valve for a fuel cell including a valve member having a drive shaft; a flow path forming pressure chamber constituting a flow path provided in the valve, a first pressure chamber, and a second pressure chamber; two supply/discharge ports provided in the first pressure chamber and the second pressure chamber, via which fluid is supplied to and discharged from the first pressure chamber and the second pressure chamber, wherein the drive shaft is subjected to a force corresponding to a pressure difference between the first pressure chamber and the second pressure chamber, wherein pressure chamber side opened ends of two supply/discharge ports are positioned higher than lowest points of inner surfaces of wall portions of the first pressure chamber and the second pressure chamber as seen in a gravity acting direction.

The present invention further provides a valve for a fuel cell connected to a supply/discharge tube that supplies and discharges fluid to and from a pressure chamber provided in the valve, wherein a pressure chamber side opened end of the supply/discharge tube protrudes inward from an inner surface of the pressure chamber.

The present invention further provides a fuel cell vehicle including a fuel cell that generates electricity through an electrochemical reaction between an oxidizing gas and a fuel gas, and a fuel cell valve including a pressure chamber provided therein and connected to a supply/discharge tube that causes the pressure chamber to communicate with the atmosphere constantly or according to a situation, wherein the supply/discharge tube is positioned behind a housing constituting the fuel cell valve as seen from a front side to a rear side of the vehicle. Preferably, the supply/discharge tube protrudes rearward or obliquely rearward with respect to the vehicle.

According to the valve for a fuel cell provided by the present invention, the overall circumference of the peripheral portion of a pressure chamber side opened end of the tubelike member can be increased because the valve is connected to the tubelike member that supplies and discharges fluid to and from a pressure chamber provided in the valve, wherein the pressure chamber side opened end of the tubelike member, between both end openings of the tubelike member, is obliquely cut with respect to the axial direction of the tubelike member. Therefore, compared to a structure wherein the pressure chamber side opened end of the tubelike member is not obliquely cut with respect to the axial direction, the present invention can widen the area of the opening on the pressure chamber side end of the tubelike member, and can prevent water from adhering to the pressure chamber side opened end due to a surface tension acting on the pressure chamber side opened end. As a result, the operational performance of the fuel cell valve can be improved.

The valve for a fuel cell provided by the present invention includes the valve member having the drive shaft; a flow path forming pressure chamber constituting a flow path provided in the valve member, a first pressure chamber, and a second pressure chamber; two supply/discharge ports provided in the first pressure chamber and the second pressure chamber, via which fluid is supplied to and discharged from the first pressure chamber and the second pressure chamber, wherein the drive shaft is subjected to a force corresponding to a pressure difference between the first pressure chamber and the second pressure chamber, wherein pressure chamber side opened ends of two supply/discharge ports are positioned higher than the lowest points of inner surfaces of wall portions of the first pressure chamber and the second pressure chamber as seen in the gravity acting direction. Therefore, the operational performance of the fuel cell valve can be improved.

More specifically, the present invention can prevent pressure variations in the flow path forming pressure chamber due to valve opening/closing operations from influencing the displacement of the drive shaft because the valve includes the flow path forming pressure chamber constituting the flow path provided in the valve, the first pressure chamber, and the second pressure chamber; two supply/discharge ports provided in the first pressure chamber and the second pressure chamber, via which fluid is supplied to and discharged from the first pressure chamber and the second pressure chamber, wherein the drive shaft is subjected to the force corresponding to the pressure difference between the first pressure chamber and the second pressure chamber. Therefore, the operational performance of the fuel cell valve can be improved.

Furthermore, the pressure chamber side opened ends of the two supply/discharge ports are positioned higher, in the direction of gravity, than the lowest points of inner surfaces of wall portions of the first pressure chamber and the second pressure chamber. Therefore, even when water is present in the first pressure chamber and the second pressure chamber, the valve can prevent the water from keeping of adhering on the periphery of the openings of the two supply/discharge ports. Therefore, the present invention can prevent water adhering on the edge portion of the supply/discharge port from freezing and can prevent ice from narrowing or blocking the opening of the supply/discharge port. Thereby, the operational performance of the fuel cell valve can be improved.

According to the fuel cell valve provided by the present invention, the valve is connected to the supply/discharge tube that supplies and discharges fluid to and from the pressure chamber provided in the valve and the pressure chamber side opened end of the supply/discharge tube protrudes inward from the inner surface of the pressure chamber. Therefore, the valve can prevent water (e.g., condensation) adhering on the wall surface of the pressure chamber from flowing into the periphery of the pressure chamber side opened end of the supply/discharge tube and can prevent the water adhered on the edge portion of the supply/discharge tube from freezing, and can also prevent ice from narrowing or blocking the opening of the supply/discharge port. The operational performance of the fuel cell valve can therefore be further improved.

The fuel cell vehicle provided by the present invention includes the supply/discharge tube that causes the pressure chamber to communicate with the atmosphere constantly or according to a situation and is positioned behind the housing constituting the fuel cell valve as seen from the vehicle front side to the vehicle rear side. Therefore, when fuel cell vehicle is in a travelling condition, the housing having a higher rigidity compared to the supply/discharge tube can prevent the supply/discharge tube from colliding with a foreign object (e.g., snow or a bouncing stone) coming from the front side of the vehicle.

Therefore, the present invention can prevent the supply/discharge tube having a relatively low rigidity from being broken or deformed and can still further improve the operational performance of the fuel cell valve.

DESCRIPTION OF EXEMPLARY EMBODIMENTS

First Embodiment of the Invention

Figure 1:
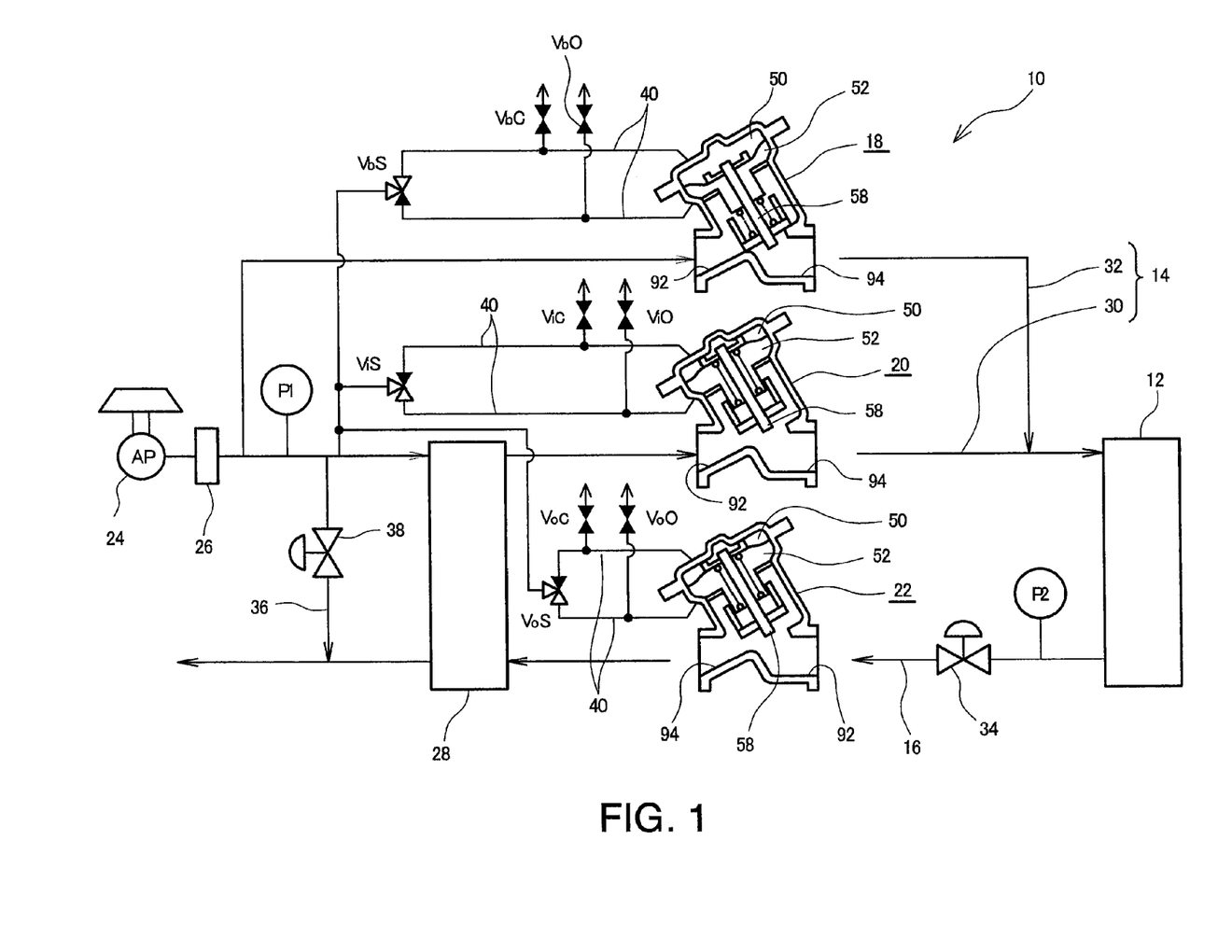
FIG. 1 illustrates a basic arrangement of a fuel cell system including fuel cell valves according to a first embodiment of the present invention.

A first embodiment of the present invention will be described with reference to the drawings. FIGS. 1 to 6 illustrate the present embodiment. FIG. 1 illustrates a schematic arrangement of a fuel cell system including a fuel cell valve according to the present embodiment. A fuel cell system 10 includes a fuel cell stack 12, an oxidizing gas supplying flow path 14 and an oxidizing gas system discharging flow path 16, a humidifier bypass valve 18, an inlet shutoff valve 20, and an outlet shutoff valve 22.

The fuel cell stack 12 generates electricity through an electrochemical reaction between oxygen and hydrogen. More specifically, a hydrogen gas serving as a fuel gas and air serving as an oxidizing gas are supplied to the fuel cell stack 12. Electric energy can be obtained from a plurality of fuel cells (not illustrated) in the fuel cell stack 12, through an electrochemical reaction between oxygen and hydrogen. The fuel cell includes, for example, a film-electrode assembly of electrolytic films each being sandwiched between an anode side electrode and a cathode side electrode, and separators disposed at both ends of the film-electrode assembly.

The fuel cell system 10 according to the present embodiment is, for example, installable on and usable for a fuel cell vehicle, wherein the fuel cell stack 12 serves as a power source of a vehicle traction motor. The fuel cell system according to the present embodiment can also be used for other devices other than vehicle traction motor.

The air serving as an oxidizing gas is supplied via the oxidizing gas supplying flow path 14 to the fuel cell stack 12. An air compressor 24 and an intercooler 26 are provided on the gas upstream side of the oxidizing gas supplying flow path 14. The air, compressed by the air compressor 24, is cooled by the intercooler 26 and humidified by a humidifier 28. Then, the air is supplied to a flow path on the cathode side electrode side of the fuel cell stack 12.

In addition to a main path 30 that supplies air to the fuel cell stack 12 via the humidifier 28, a humidifier bypass path 32 is provided in parallel with the main path 30 with respect to the flow direction of gas. The air passing through the humidifier bypass path 32 is supplied to the fuel cell stack 12 without passing through the humidifier 28. The humidifier bypass valve 18 is provided at an appropriate position of the humidifier bypass path 32.

An air off-gas, i.e., air having been supplied to the fuel cell stack 12 and used for the electrochemical reaction in each fuel cell, is discharged from the fuel cell stack 12 via the oxidizing gas system discharging flow path 16. The air off-gas, which is discharged via the oxidizing gas system discharging flow path 16, is sent to the humidifier 28 via a pressure regulating valve 34. Then, the air off-gas is discharged to the atmosphere via a diluter (not illustrated). The pressure regulating valve 34 is controlled to adjust the pressure (back-pressure) of the air discharged from the fuel cell stack 12 to be an appropriate pressure value according to an operational state of the fuel cell stack 12. More specifically, the air pressure in the oxidizing gas system discharging flow path 16, which corresponds to the position of a pressure sensor P2, can be adjusted according to a valve opening degree of the pressure regulating valve 34. The humidifier 28 has a function of humidifying fresh air to be supplied to the fuel cell stack 12 by removing water from the air discharged from the fuel cell stack 12 and adding the removed water to the fresh air.

The fuel cell stack 12 is connected to a hydrogen gas supplying flow path that supplies a hydrogen gas, and to a hydrogen gas system discharging flow path that discharges a hydrogen gas system gas, not illustrated in FIG. 1.

A fuel cell bypass path 36 has one end connected to the main path 30 of the oxidizing gas supplying flow path 14, at a position between an upstream side connecting portion of the humidifier bypass path 32 and the humidifier 28, and another end connected to the oxidizing gas system discharging flow path 16 on the gas downstream side of the humidifier 28. The flow of gas through the fuel cell bypass path 36 is parallel to that through the fuel cell stack 12. A fuel cell bypass valve 38 is provided in the fuel cell bypass path 36. The fuel cell bypass valve 38 can be used to control the pressure of air supplied to the fuel cell stack 12. More specifically, the pressure of air in the oxidizing gas supplying flow path 14, corresponding to an inlet pressure sensor P1 position, can be adjusted by the valve opening degree of the fuel cell bypass valve 38. The air pressure corresponding to the inlet pressure sensor P1 position can be also adjusted by the flow amount of air discharged from the air compressor 24. Needless to say, both the valve opening degree of the fuel cell bypass valve 38 and the flow amount of the air discharged from the air compressor 24 can be used to adjust the air pressure corresponding to the inlet pressure sensor P1 position.

When the fuel cell system 10 starts its operation at a low temperature below the freezing point of water, it is desirable to quickly increase the temperature of the fuel cell stack 12. To this end, the amount of air supplied to the fuel cell stack 12 can be reduced compared to an amount required to generate electricity through a reaction with the hydrogen gas supplied to the fuel cell stack 12. More specifically, the cathode stoichiometric ratio can be reduced to generate electricity at a lower efficiency and quickly increase the temperature of the fuel cell stack 12. However, the hydrogen concentration in the oxidizing gas system discharging flow path 16 may become higher due to the hydrogen gas transferring from an anode side flow path to a cathode side flow path via the electrolytic film in the fuel cell stack 12. In this case, as an example operation of the fuel cell bypass valve 38, the fuel cell bypass valve 38 can be kept in a valve-opened state to reduce the hydrogen concentration in the oxidizing gas system discharging flow path 16 using the air bypassing the fuel cell stack 12. Similarly, the concentration of hydrogen in the hydrogen off-gas (hydrogen gas system gas discharged from the fuel cell stack 12) may become higher compared to a normal value configuration. To prevent this, the fuel cell bypass valve 38 can be kept in an open state to increase the amount of air flowing into the diluter without passing through the fuel cell stack 12. As a result, the concentration of hydrogen in the discharged gas can be reduced.

The inlet shutoff valve 20 is provided in the main path 30 of the oxidizing gas supplying flow path 14 downstream of the humidifier 28. The outlet shutoff valve 22 is provided in the oxidizing gas system discharging flow path 16 upstream of the humidifier 28.

More specifically, the humidifier bypass valve 18, the inlet shutoff valve 20, and the outlet shutoff valve 22 are fuel cell valves that can function as fluid control valves capable of adjusting the flow of air in the flow path. Three PSVs (Pressure Switching Valves), which are electromagnetic valves, are connected to each of these valves 18, 20, and 22 via a pressure controlling flow path 40.

More specifically, three PSVs VbS, VbC, and VbO are connected to the humidifier bypass valve 18. Three PSVs ViS, ViC, and Vi0 are connected to the inlet shutoff valve 20. Three PSVs VoS, VoC, and VoO are connected to the outlet shutoff valve 22. These PSVs are connected to upstream side the main path 30 of the oxidizing gas supplying flow path 14 via the pressure controlling flow path 40, for example a position between the air compressor 24 and the humidifier 28. These PSVs can be controlled by a control unit (not illustrated), such as ECU (Electronic Control Unit).

Operations of the humidifier bypass valve 18, the inlet shutoff valve 20, and the outlet shutoff valve 22 are controlled by the corresponding PSVs according to the operational state of the fuel cell stack 12.

Next, the arrangement and functions of the inlet shutoff valve 20 and the outlet shutoff valve 22 will be described with reference to FIG. 2, which representatively illustrates the outlet shutoff valve 22. The inlet shutoff valve 20 and the outlet shutoff valve 22 are similar in arrangement. An arrangement of the humidifier bypass valve 18 will be described later.

Figure 2:
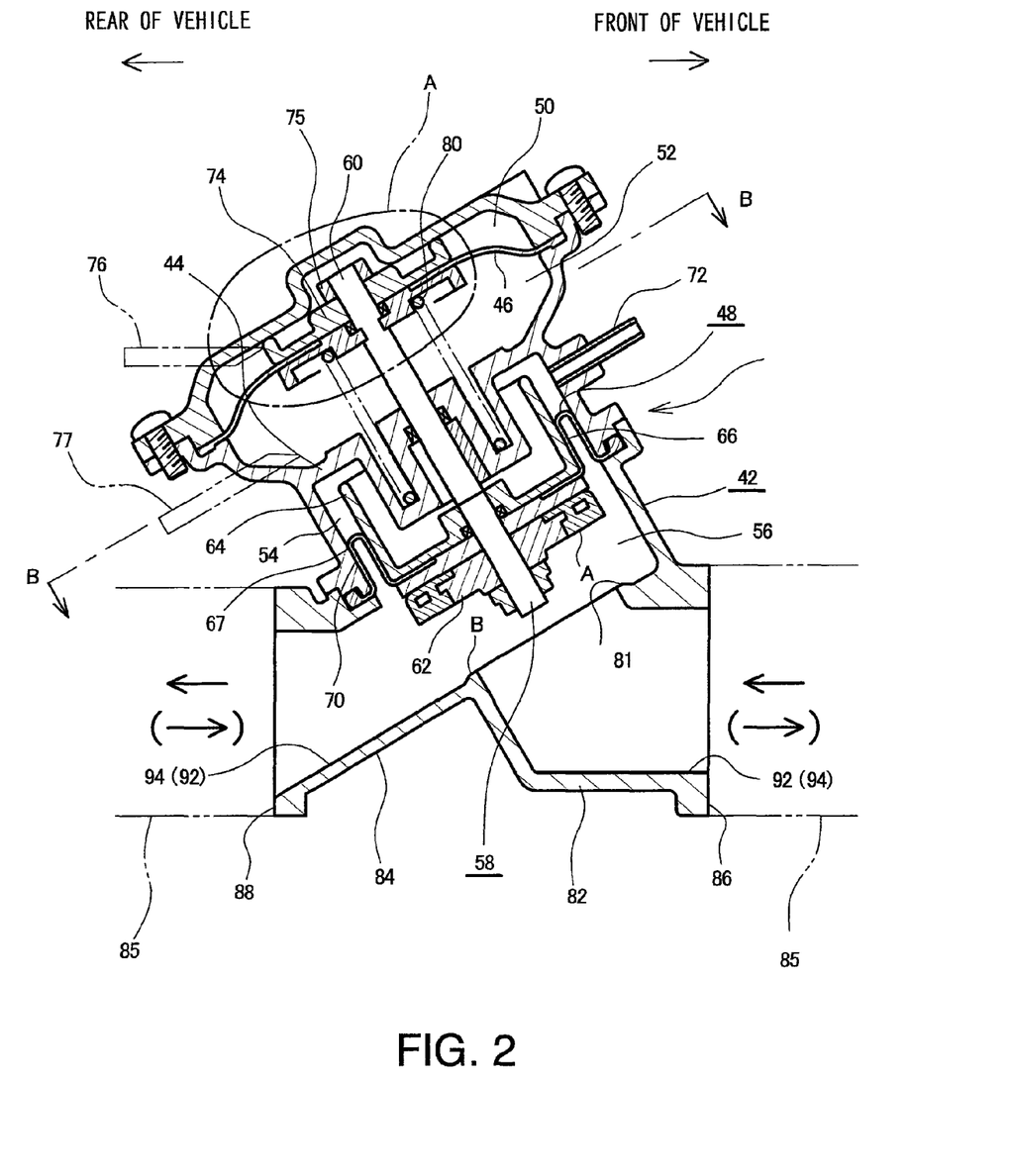
FIG. 2 is a cross-sectional view illustrating a structure of an outlet shutoff valve (or an inlet shutoff valve) serving as a valve for a fuel cell in the fuel cell system illustrated in FIG. 1, in a state in which the valve is open.

As illustrated in FIG. 2, the outlet shutoff valve 22 is shutoff valve which is normally open, one where the valve member is open in a normal state where all of inside pressure chambers are kept at the same pressure.

The outlet shutoff valve 22 includes upper and lower spaces separated by a partition 44 in a housing 42 constituted by a plurality of housing elements assembled together. A main diaphragm 46 is provided in one of the separated spaces and a sub diaphragm 48 is provided in the other space. A valve-closing pressure chamber 50 is provided on an upper surface side of the main diaphragm 46. A valve-opening pressure chamber 52 is provided on a lower surface side of the main diaphragm 46. An atmospheric pressure chamber 54 is provided on an upper surface side of the sub diaphragm 48. A flow path forming pressure chamber 56 is provided on a lower surface side of the sub diaphragm 48. The valve-closing pressure chamber 50, the valve-opening pressure chamber 52, the atmospheric pressure chamber 54, and the flow path forming pressure chamber 56 are mutually separated. Any two of these pressure chambers 50, 52, 54, and 56 cannot communicate with each other.

The main diaphragm 46 and the sub diaphragm 48 are connected to a valve member 58. More specifically, the valve member 58 including a drive shaft 60 is present in the housing 42. The valve member 58 is supported by the housing 42, so as to be displaceable in the axial direction of the drive shaft 60. The valve member 58 includes the drive shaft 60 and a disk-shaped valve member body 62 fixed to a lower edge portion of the drive shaft 60. The drive shaft 60 is inclined with respect to the vertical direction (up-and-down direction in FIG. 2), which is the direction in which gravity acts. The drive shaft 60 can move in a direction inclined with respect to the vertical direction. Correspondingly, a portion of the housing 42 that surrounds the outer periphery and the upper end of the drive shaft 60 is inclined with respect to the vertical direction. A tubelike member 64 having a bottom portion is connected to an intermediate lower-side portion of the drive shaft 60.

An inner circumferential portion of the sub diaphragm 48, which is made of an elastic member (e.g., a rubber or an elastomer) is sandwiched between a lower surface of a bottom plate portion of the tubelike member 64 and an upper surface of the valve member body 62. Thus, an inner circumferential portion of the sub diaphragm 48 is fixed to the drive shaft 60. An outer peripheral edge portion of the sub diaphragm 48 is connected to an inner cylindrical portion of the housing 42, more specifically, sandwiched between two housing elements constituting the housing 42. Thus, a lower-side space of the housing 42, which is positioned below the partition 44, is separated into the atmospheric pressure chamber 54 (an upper-side portion) and the flow path forming pressure chamber 56 (a lower-side portion) by the sub diaphragm 48. The atmospheric pressure chamber 54 and the flow path forming pressure chamber 56 are hermetically isolated.

The sub diaphragm 48 has a diaphragm side cylindrical portion 66 at an intermediate portion in the radial direction. The diaphragm side cylindrical portion 66 is elastically deformed along and pressed against an outer cylindrical surface of the tubelike member 64. The sub diaphragm 48 has an annular deformable portion 67, which is present between the outer cylindrical surface of the tubelike member 64 and an inner surface of the housing 42. The annular deformable portion 67 is deformed upward so as to form an annular chevron shape, a lower surface of which can receive the pressure of the flow path forming pressure chamber 56. As illustrated in FIG. 2, when the lower surface of the annular deformable portion 67 receives the pressure of the flow path forming pressure chamber 56, the sub diaphragm 48 elastically deforms and the drive shaft 60 moves obliquely upward.

The sub diaphragm 48 has a second diaphragm side cylindrical portion 70 at an outer intermediate portion in the radial direction. The second diaphragm side cylindrical portion 70 is elastically deformed along and pressed against a cylindrical surface portion of the inner surface of the housing 42. When the drive shaft 60 moves downward from the valve-opened state illustrated in FIG. 2, the second diaphragm side cylindrical portion 70 elastically deforms while its upper portion is pulled off the cylindrical surface portion of the housing 42.

The flow path forming pressure chamber 56 constitutes part of the oxidizing gas system discharging flow path 16 (FIG. 1) (the oxidizing gas supplying flow path 14 in the case of the inlet shutoff valve 20). Upstream and Downstream portions of the flow path forming pressure chamber 56 are connected and disconnected by the valve member 58 (FIG. 2). The atmospheric pressure chamber 54 is connected to an atmosphere communicating tube 72, one of which is open to the atmosphere. Thus, the atmospheric pressure chamber 54 is open to the atmosphere.

A suppressing member 74 is connected to an upper end portion of the valve member 58. The suppressing member 74 includes two disk-shaped elements united together with a fastening nut 75. An inner peripheral edge portion of the main diaphragm 46, made of an elastic member (e.g., rubber or elastomer), is sandwiched between two disk-shaped elements constituting the suppressing member 74. Therefore, the main diaphragm 46 is fixed to an outer circumferential portion of the suppressing member 74. An outer peripheral edge portion of the main diaphragm 46 is sandwiched between two housing elements constituting the housing 42. Thus, the outer peripheral edge portion of the main diaphragm 46 is fixed to the inner circumferential portion of the housing 42. Accordingly, an upper-side space of the housing 42, which is positioned above the partition 44, is separated into the valve-closing pressure chamber 50 (an upper-side portion) and the valve-opening pressure chamber 52 (a lower-side portion) by the main diaphragm 46. The valve-closing pressure chamber 50 and the valve-opening pressure chamber 52 are hermetically isolated. An upper supply/discharge tube 76 is connected to the valve-closing pressure chamber 50. A lower supply/discharge tube 77 is connected to the valve-opening pressure chamber 52. In the present embodiment, the valve-closing pressure chamber 50 corresponds to a first pressure chamber as described in the claims. The valve-opening pressure chamber 52 corresponds to a second pressure chamber as described in the claims.

Figure 3:
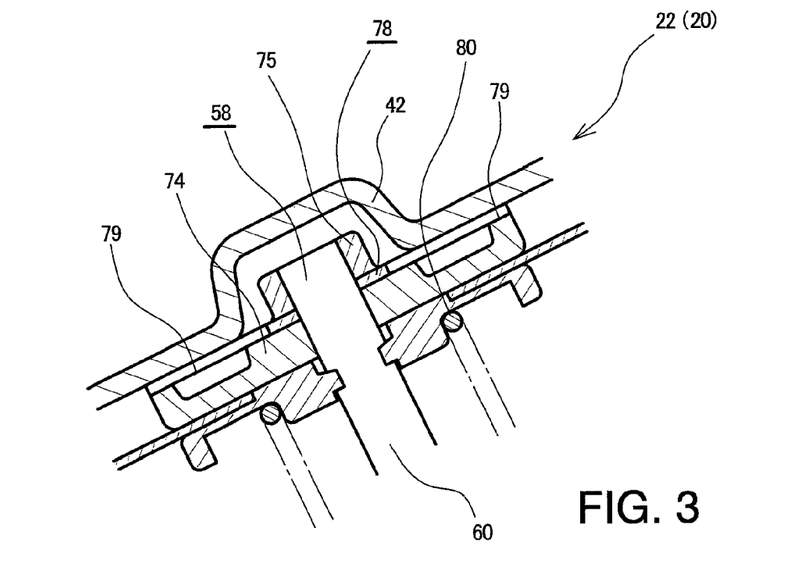
FIG. 3 is an enlarged view of a portion A illustrated in FIG. 2.

As illustrated in FIG. 3, an elastic sheet 78 is sandwiched between an upper-side disk-shaped element (one of two disk-shaped elements constituting the suppressing member 74) and the nut 75. The elastic sheet 78 is made of a disk-shaped elastic member (e.g., rubber). An outer peripheral portion of the elastic sheet 78 can contact an upper portion of the inner surface of the housing 42 in a state where the drive shaft 60 constituting the valve member 58 is fully shifted to an obliquely upper position.

Figure 4:
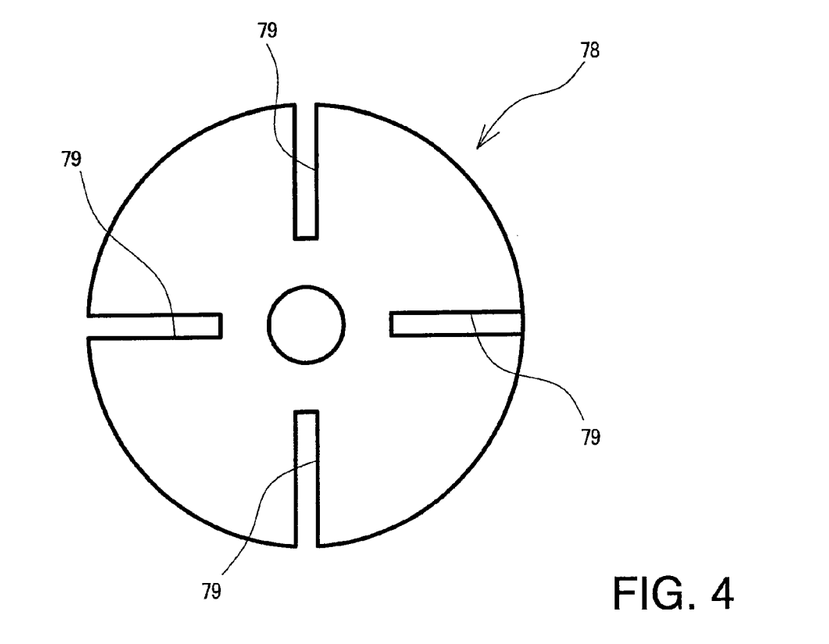
FIG. 4 illustrates an elastic sheet in a state where it is taken out from the arrangement illustrated in FIG. 3 and viewed from above.

The elastic sheet 78 includes grooves 79 extending in radial directions in a radial-outer region and partially opened at the outer circumferential periphery or at a plurality of portions (four portions according to the illustrated example) in the circumferential direction, as illustrated in detail in FIG. 4. The grooves 79 realize a gas releasing structure capable of releasing the air or air off-gas, which tends to be compressed between the elastic sheet 78 and the upper portion of the inner surface of the housing 42 when the elastic sheet 78 contacts the upper portion of the inner surface of the housing 42, to the outside of the outer circumferential periphery of the suppressing member 74.

A coil spring 80, which serves as elastic force applying means, is provided between a lower surface of the suppressing member 74 and the partition 44. The coil spring 80 generates an elastic force acting to the valve member 58 in an obliquely upper direction, more specifically, in a direction bringing the valve member 58 into an opening state. When the valve member 58 moves in an obliquely lower direction, a lower surface of the valve member body 62 illustrated in FIG. 2 is brought into contact with a valve seat 81 and closes the flow path. More specifically, the flow path can be disconnected or connected according to a displacement of the drive shaft 60 in its axial direction. The diameter of a pressure-receiving area of an upper-side portion (including the main diaphragm 46) of the drive shaft 60 is sufficiently larger than the diameter of a pressure-receiving area of a lower-side portion (including the sub diaphragm 48) of the drive shaft 60.

As illustrated in FIG. 2, in the housing 42, an inlet side connecting portion 82 and an outlet side connecting portion 84 are provided at a gas upstream side and a gas downstream side of the flow path forming pressure chamber 56. The inlet side connecting portion 82 includes a valve member 58 side inclined with respect to the vertical direction and a connection edge portion (right edge portion in FIG. 2) that includes a connecting surface 86 to be connected to a pipe 85 and facing to the horizontal direction.

The outlet side connecting portion 84 inclines relative to the vertical direction in a manner opposed to the direction of the valve member 58 side of the inlet side connecting portion 82. The outlet side connecting portion 84 has a connection side edge portion (left edge portion in FIG. 2), which includes a connecting surface 88 to be connected to a pipe 85 and facing to the horizontal direction. The inlet side connecting portion and the outlet side connecting portion of the inlet shutoff valve 20 are oppositely disposed compared to the inlet side connecting portion 82 and the outlet side connecting portion 84 of the outlet shutoff valve 22.

The outlet shutoff valve 22 includes mutually pressing surfaces A and B of the valve member body 62 and the valve seat 81, which are inclined with respect to the vertical direction, more specifically, relative to the direction of gravity. The pressing surfaces A and B are inclined such that they are higher on the side upstream of the gas flow in the gas flow path (right side of FIG. 2), i.e., in the flow path forming pressure chamber 56, and lower on the downstream side (left side of FIG. 2). Similarly, the inlet shutoff valve 20 includes mutually pressing surfaces A and B of the valve member body 62 and the valve seat 81, which are inclined with respect to the vertical direction. However, the position of the pressing surfaces A and B is lower on the upstream side (left side of FIG. 2) of the gas flowing in the flow path forming pressure chamber 56 and higher on the gas downstream side (right side of FIG. 2).

According to the outlet shutoff valve 22, the valve-closing pressure chamber 50 is connected to the pressure controlling flow path 40 on the PSV VoC (FIG. 1) side via the upper supply/discharge tube 76. The valve-opening pressure chamber 52 is connected to the pressure controlling flow path 40 on the PSV VoO (FIG. 1) side via the lower supply/discharge tube 77 (FIG. 2). When the drive shaft 60 (FIG. 2) moves in its axial direction, a central portion of the main diaphragm 46 moves in an obliquely up-and-down direction while the shape of the main diaphragm 46 deforms. Obviously, the main diaphragm 46 can also be configured to move entirely in the obliquely up-and-down direction. In the present embodiment, the upper supply/discharge tube 76 and the lower supply/discharge tube 77 correspond to a tubelike member described in the claims.

In particular, in the present embodiment, one end (the right edge in FIG. 2) of the lower supply/discharge tube 77 is obliquely cut with respect to its axial direction. The obliquely cut end protrudes inward, as a valve-opening pressure chamber 52 side edge portion, from a wall portion of the valve-opening pressure chamber 52, more specifically from an inner surface of the housing 42. The valve-opening pressure chamber 52 side edge portion of the lower supply/discharge tube 77 is configured to be substantially parallel to an inner surface shape of the housing 42.

Figure 5:
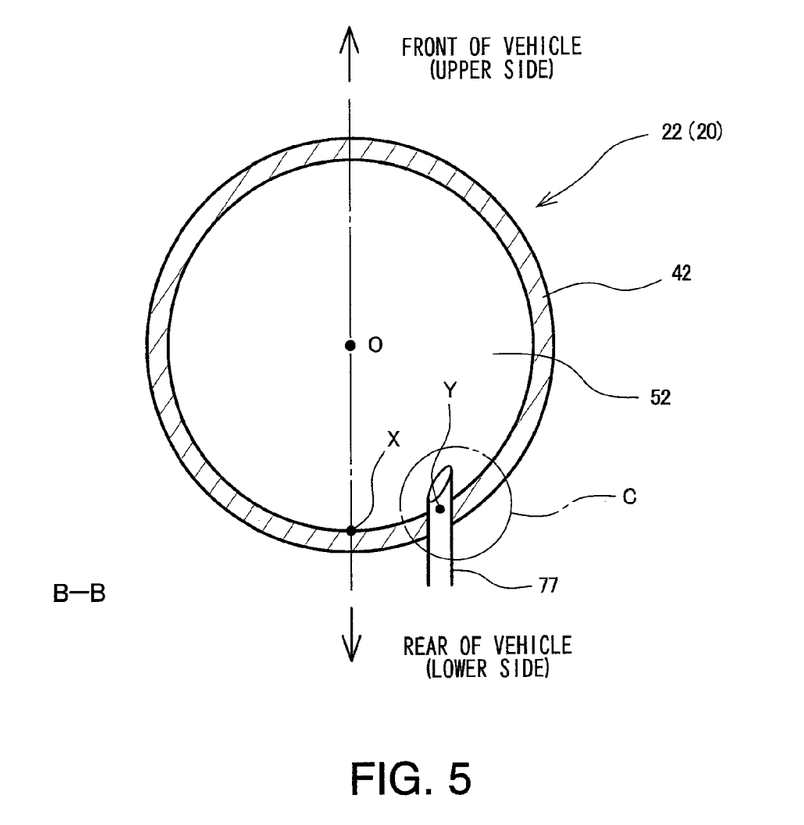
FIG. 5 is a cross-sectional view taken along a line B-B of FIG. 2.
Figure 6:
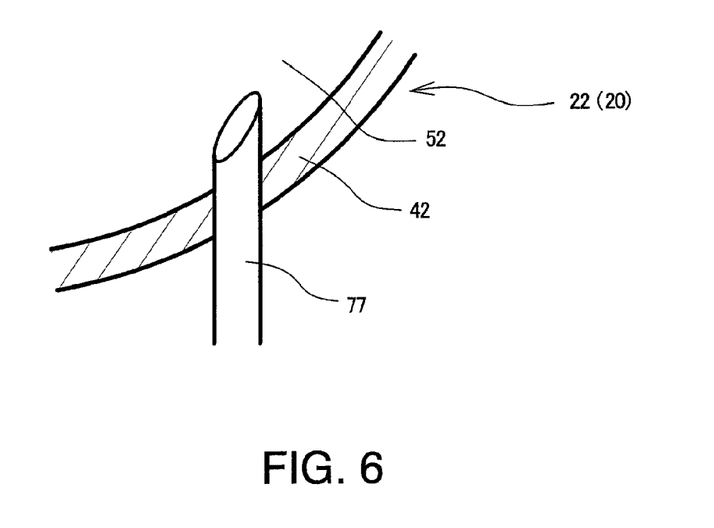
FIG. 6 is an enlarged view of a portion C illustrated in FIG. 5.

Furthermore, a valve-opening pressure chamber 52 side opened end of the hole of the lower supply/discharge tube 77 is positioned higher, in the direction of gravity, than the lowest point of the inner surface of the housing 42 (the wall portion of the valve-opening pressure chamber 52). FIG. 5 is a B-B cross-sectional view taken along a virtual plane perpendicular to the central axis of the drive shaft 60 in FIG. 2. FIG. 6 is an enlarged view of a portion C illustrated in FIG. 5. The lower side of FIGS. 5 and 6 corresponds to the lower side in the oblique direction in FIG. 2. The upper side of FIGS. 5 and 6 corresponds to the upper side in the oblique direction in FIG. 2. As illustrated in FIG. 5, in the B-B cross section of the inner surface of the housing 42, the lowest point is a point X position. On the other hand, in the present embodiment, the hole of the lower supply/discharge tube 77 is disposed at a point Y position on a circle having its center on the central axis O of the drive shaft (FIG. 5) and passing the point X position, which is offset from the point X position in the circumferential direction. Furthermore, the valve-opening pressure chamber 52 side opened end of the lower supply/discharge tube 77 protrudes inward, more specifically obliquely upward, from the inner surface of the housing 42. Therefore, the valve-opening pressure chamber 52 side opened end of the hole of the lower supply/discharge tube 77 is positioned higher than the lowest point (point X position) of the inner surface of the housing 42.

Similarly, one end (right edge of FIG. 2) of the upper supply/discharge tube 76 is obliquely cut with respect to the axial direction of the upper supply/discharge tube 76. The obliquely cut end protrudes inward, as a valve-closing pressure chamber 50 side edge portion, from a wall portion of the valve-closing pressure chamber 50, more specifically from the inner surface of the housing 42. The valve-closing pressure chamber 50 side edge portion of the upper supply/discharge tube 76 is configured to be substantially parallel to the inner surface shape of the housing 42. Furthermore, a valve-closing pressure chamber 50 side opened end of the hole of the upper supply/discharge tube 76 is positioned higher, in the direction of gravity, than the lowest point of the inner surface of the housing 42 (the wall portion of the valve-closing pressure chamber 50).

In FIG. 2, the upper supply/discharge tube 76 and the lower supply/discharge tube 77 are indicated by alternate long and two short dashes line. However, in practice, the pressure chamber 50 side opened end of the upper supply/discharge tube 76 and the pressure chamber 52 side opened end of the lower supply/discharge tube 77 are positioned higher than the positions illustrated in FIG. 2. More specifically, as described above, the opened ends of the supply/discharge tubes 76 and 77 are present at the positions offset from the illustrated positions in the circumferential direction on the circle having its center on the central axis of the drive shaft 60. The upper supply/discharge tube 76 and the lower supply/discharge tube 77, as described below, connect the valve-closing pressure chamber 50 and the valve-opening pressure chamber 52 to the atmosphere via the VoC or VoO illustrated in FIG. 1 (ViC or ViO in the case of the inlet shutoff valve 20) according to the situation.

In the outlet shutoff valve 22, if the valve member 58 moves upward due to a displacement of the drive shaft 60 as illustrated in FIG. 2, the valve opens to allow air off-gas (oxidizing gas system gas) to flow from its inlet 92 to its outlet 94. Therefore, the air off-gas can be discharged via the oxidizing gas system discharge flow path 16 (FIG. 1) from the upstream side thereof to the humidifier 28 side thereof. If the valve member 58 moves downward due to a displacement of the drive shaft 60 (FIG. 2), the valve closes and stops the flow of air off-gas in the oxidizing gas system discharging flow path 16 (FIG. 1) directed from the upstream side to the humidifier 28.

In the case of the inlet shutoff valve 20, the inlet 92 and the outlet 94 are oppositely disposed compared to those of the outlet shutoff valve 22. If the valve member 58 moves upward due to a displacement of the drive shaft 60, the valve opens to discharge the air via the oxidizing gas supplying flow path 14 (FIG. 1) from its upstream side to the fuel cell stack 12. If the valve member 58 moves downward due to a displacement of the drive shaft 60 (FIG. 2), the valve closes and stops the flow of air in the oxidizing gas supplying flow path 14 (FIG. 1) directed from its upstream side to the fuel cell stack 12.

The displacement of the drive shaft 60 (FIG. 2) in its axial direction can be controlled by three PSVs. More specifically, three PSVs VoS, VoC, and VoO (FIG. 1) control the pressures in the valve-opening pressure chamber 52 and the valve-closing pressure chamber 50 of the outlet shutoff valve 22. Similarly, three PSVs ViS, ViC, and ViO control the valve-opening pressure chamber 52 and the valve-closing pressure chamber 50 of the inlet shutoff valve 20.

The VoS (or ViS) illustrated in FIG. 1 is a 3 WAY, i.e., three-way valve type, PSV capable of selectively connecting one of the valve-closing pressure chamber 50 and the valve-opening pressure chamber 52 to a gas discharge side of the air compressor 24 and disconnecting the other pressure chamber from the gas discharge side of the air compressor 24. Each of VoC, VoO, ViC, and ViO is a 2 Way PSV which functions as an exhaust valve, i.e., a pressure relief valve. The VoS (or ViS) can change the connection state of the flow path according to an energized state. If the VoS (or ViS) is not energized (i.e., in a non-energized state), the VoS (or ViS) connects the gas discharge side of the air compressor 24 to the valve-opening pressure chamber 52. If the VoS (or ViS) is energized (i.e., in an energized state), the VoS (or ViS) connects the gas discharge side of the air compressor 24 to the valve-closing pressure chamber 50. Each of the ViC, ViO, VoC, and VoO closes the valve in the non-energized state and opens the valve in the energized state.

In FIGS. 1 and 2 illustrating a plurality of triangles representing VoS (ViS), VoC(ViC), and VoO(ViO), each black triangle indicates a state wherein the flow path is closed and each white triangle indicates a state where the flow path is opened.

When the outlet shutoff valve 22 (or the inlet shutoff valve 20) in a valve-closed state is opened as illustrated in FIG. 2, the VoS (or ViS) (FIG. 1) is kept in the non-energized state and the VoC (ViC) is brought into the valve-opened state to let the valve-closing pressure chamber 50 communicate with the atmosphere via the upper supply/discharge tube 76 (FIG. 2). More specifically, the upper supply/discharge tube 76 can communicate with the atmosphere. Then, pressurized air supplied by the air compressor 24 (FIG. 1) is introduced into the valve-opening pressure chamber 52 via the lower supply/discharge tube 77 (FIG. 2) and the pressure controlling flow path 40 (FIG. 1). Thus, a pressure difference appears between the pressure in the valve-opening pressure chamber 52 and the pressure (atmospheric pressure) in the valve-closing pressure chamber 50.

The pressurized air is also introduced to the flow path forming pressure chamber 56 (FIG. 2) from the air compressor 24 via an upstream side portion of the oxidizing gas supplying flow path 14. Therefore, a pressure difference appears between the pressure in the flow path forming pressure chamber 56 (FIG. 2) and the pressure in the atmospheric pressure chamber 54 opened to the atmosphere. The pressure of the flow path forming pressure chamber 56 is applied to the lower surface of the annular deformable portion 67 of the sub diaphragm 48. Therefore, the sub diaphragm 48 pushes the tubelike member 64 upward. The drive shaft 60 moves upward as illustrated in FIG. 2. The annular deformable portion 67 is kept in a greatly deformed state. As a result, the drive shaft 60 is subjected to a first force F1 that acts upward and corresponds to the pressure difference between the flow path forming pressure chamber 56 and the atmospheric pressure chamber 54, a second force F2 that acts upward and corresponds to the pressure difference between the valve-closing pressure chamber 50 and the valve-opening pressure chamber 52, and the elastic force of the coil spring 80. The drive shaft 60 moves upward. In the state wherein the outlet shutoff valve 22 is in the fully opened state illustrated in FIG. 2, an upper surface of the suppressing member 74 abuts an upper portion of the inner surface of the housing 42 via the elastic sheet 78 as illustrated in FIG. 3.

More specifically, in the state wherein the drive shaft 60 is fully shifted to the obliquely upper portion, an outer peripheral portion of the elastic sheet 78 made of an elastic member (e.g., rubber) abuts the upper portion of the inner surface of the housing 42. Therefore, in the valve-opened state wherein the drive shaft 60 is positioned higher, the drive shaft 60 or a metallic portion fixed to the drive shaft 60, such as the suppressing member 74, can be prevented from colliding with the metallic housing 42. Thus, generation of loud noise can be suppressed.

The grooves 79 extending in radial directions are formed in the radial-outer region of the elastic sheet 78 and opened to the outer circumferential periphery of the elastic sheet 78, partly in the circumferential direction or at a plurality of portions in the circumferential direction. When the elastic sheet 78 is brought into the inner surface of the housing 42, the air or air-off gas that tends to be compressed between the elastic sheet 78 and the upper portion of the inner surface of the housing 42 can be released via the grooves 79 to the outside of the outer circumferential periphery of the suppressing member 74. Therefore, the present embodiment can prevent the air or air-off gas from being compressed between the upper portion of the inner surface of the housing 42 and the suppressing member 74 and the elastic sheet 78. The present embodiment can eliminate a cushioning reaction caused by a reaction force of the air or air off-gas and can improve the operational performances of the inlet shutoff valve 20 and the outlet shutoff valve 22.

Instead of omitting the elastic sheet 78, the upper disk-shaped element of two disk-shaped elements constituting the suppressing member 74 can be made of an elastic member made of, for example, rubber. Furthermore, grooves constituting the gas releasing structure capable of eliminating the cushioning reaction by the gas can be formed on the upper disk-shaped element. More specifically, the grooves can release the gas that tends to be compressed between the upper disk-shaped element and the housing 42 to the outside of the outer circumferential periphery of the upper disk-shaped element. The above-described arrangement, more specifically the structure capable of suppressing generation of large collision noises and having a gas releasing structure is not limited to the valve for a fuel cell according to the present embodiment and can be applied to various valves conventionally used.

To close the outlet shutoff valve 22 (or the inlet shutoff valve 20) in the valve-opened state illustrated in FIG. 2, the Vos (or ViS) (FIG. 1) is energized to introduce the pressurized air supplied by the air compressor 24 to the valve-closing pressure chamber 50 via the upper supply/discharge tube 76 (FIG. 2) and the pressure controlling flow path 40 (FIG. 1). Additionally, the VoO (ViO) is kept in the valve-opened state to let the valve-opening pressure chamber 52 communicate with the atmosphere via the lower supply/discharge tube 77 (FIG. 2). More specifically, the lower supply/discharge tube 77 can communicate with the atmosphere. As a result, the drive shaft 60 is subjected to a third force F3 that acts downward and corresponds to the pressure difference between the pressure in the valve-closing pressure chamber 50 and the pressure (atmospheric pressure) in the valve-opening pressure chamber 52. Meanwhile, as indicated in FIG. 2, the pressurized air is introduced from the air compressor 24 to the flow path forming pressure chamber 56. The drive shaft 60 is subjected to a fourth force F4 that acts upward (the direction opposed to the third force F3) and corresponds to the pressure difference between the pressure in the flow path forming pressure chamber 56 and the pressure in the atmospheric pressure chamber 54 connected to the atmosphere. However, in the present embodiment, the diameter of a pressure-receiving area of a drive shaft 60 upper-side portion including the main diaphragm 46 is set to be sufficiently larger than the diameter of a pressure-receiving area of a drive shaft 60 lower-side portion including the sub diaphragm 48. Therefore, the drive shaft 60 moves downward against the fourth force F4 and the elastic force of the coil spring 80. The valve member body 62 can contact the valve seat 81.

The humidifier bypass valve 18 (FIG. 1) is normally kept in a closed state wherein the valve member 58 is closed under normal conditions wherein its pressure chambers are all at the same pressure. Although not illustrated in detail in the drawings, the structure of the humidifier bypass valve 18 is similar to that of the inlet shutoff valve 20 or the outlet shutoff valve 22 illustrated in FIG. 2 and includes a coil spring 80 (refer to FIG. 2) provided between an upper surface of the bottom plate portion of the tubelike member 64 and a lower surface of the partition 44. Alternatively, the humidifier bypass valve 18 can be configured as a normally closed type shutoff valve that includes a coil spring provided between an upper surface of a member fixed to the upper end portion of the valve member 58 (e.g., the suppressing member 74 (refer to FIG. 2)) and a lower surface of the housing 42.

Similar to the inlet shutoff valve 20, the humidifier bypass valve 18 includes mutually pressing surfaces A and B (refer to FIG. 2) of the valve member body 62 and the valve seat 81, which are inclined with respect to the vertical direction. The position of the pressing surfaces A and B is lower on the upstream side (left side of FIG. 2) of the gas flowing in the flow path forming pressure chamber 56 (refer to FIG. 2) and higher on the gas downstream side (right side of FIG. 2).

The humidifier bypass valve 18, as illustrated in FIG. 1, includes the valve-closing pressure chamber 50 connected to a VbC side pressure controlling flow path 40 of the PSV via the upper supply/discharge tube 76 and the valve-opening pressure chamber 52 connected to a VbO side pressure controlling flow path 40 of the PSV via the lower supply/discharge tube 77 (refer to FIG. 2). The pressure chamber (50 and 52) side edges of the upper supply/discharge tube 76 and the lower supply/discharge tube 77 protrude inward from the inner surfaces of the pressure chambers 50 and 52 and are obliquely cut with respect to the axial direction. The pressure chamber (50 and 52) side opening areas of the holes of the upper supply/discharge tube 76 and the lower supply/discharge tube 77 are positioned higher than the lowest point of the inner surface of the housing 42, similar to the structures of the inlet shutoff valve 20 and the outlet shutoff valve 22.

In the humidifier bypass valve 18 (FIG. 1), if the valve member 58 moves upward due to a displacement of the drive shaft 60 (refer to FIG. 2), the valve opens and discharges the air via the humidifier bypass path 32 (FIG. 1) from its upstream side to a fuel cell stack 12 side. If the valve member 58 moves downward due to a displacement of the drive shaft 60 (FIG. 2), the valve closes and stops the flow of air in the humidifier bypass path 32 (FIG. 1) directed from its upstream side to the fuel cell stack 12.

Similar to the inlet shutoff valve 20 and the outlet shutoff valve 22, the displacement of the drive shaft 60 (FIG. 2) in its axial direction is controlled by three PSVs VbS, VbC, and VbO (FIG. 1). In FIG. 1 illustrating a plurality of triangles representing VbS, VbC, and VbO, each black triangle indicates a state wherein the flow path is closed and each white triangle indicates a state wherein the flow path is opened. The VbS in the non-energized state connects the gas discharge side of the air compressor 24 to the valve-closing pressure chamber 50. The VbS in the energized state connects the gas discharge side of the air compressor 24 to the valve-opening pressure chamber 52.

When the humidifier bypass valve 18 is opened, the pressurized air supplied by the air compressor 24 is introduced into the valve-opening pressure chamber 52 and the valve-closing pressure chamber 50 is opened to the atmosphere. As a result, the drive shaft 60 (refer to FIG. 2) is subjected to a first force F1' that acts upward and corresponds to the pressure difference between the flow path forming pressure chamber 56 into which the pressurized air is introduced from the air compressor 24 and the atmospheric pressure chamber 54 (refer to FIG. 2), a second force F2' that acts upward and corresponds to the pressure difference between the valve-closing pressure chamber 50 and the valve-opening pressure chamber 52. Therefore, the drive shaft 60 moves upward against the elastic force of the coil spring, and the humidifier bypass valve 18 is opened.

On the other hand, when the humidifier bypass valve 18 is closed, the pressurized air is supplied from the air compressor 24 to the valve-closing pressure chamber 50 and the valve-opening pressure chamber 52 is opened to the atmosphere. Then, the drive shaft 60 is subjected to a force that acts downward and corresponds to the pressure difference between the valve-opening pressure chamber 52 and the valve-closing pressure chamber 50 and the elastic force of the coil spring. Therefore, the drive shaft 60 moves downward. In this case, the drive shaft 60 is also subjected to a force that acts upward and corresponds to the pressure difference between the flow path forming pressure chamber 56 and the atmospheric pressure chamber 54. However, the diameter of the pressure-receiving area of the drive shaft 60 upper-side portion including the main diaphragm 46 (refer to FIG. 2) is set to be sufficiently larger than the diameter of the pressure-receiving area of the drive shaft 60 lower-side portion including the sub diaphragm 48 (refer to FIG. 2). Therefore, the drive shaft 60 moves downward. Then, the humidifier bypass valve 18 is closed.

The fuel cell vehicle according to the present embodiment includes the above-described fuel cell stack 12, the outlet shutoff valve 22, the inlet shutoff valve 20, and the humidifier bypass valve 18. In respective valves 22, 20, and 18, the upper supply/discharge tube 76 and the lower supply/discharge tube 77 are positioned behind the housing 42 of respective valves 22, 20, and 18, which has a higher rigidity than the supply/discharge tubes 76 and 77, as seen looking towards the rear of the vehicle from its front (from right side to left side in FIG. 2, and from upper side to lower side in FIG. 5). Therefore, in respective valves 22, 20, and 18, the upper supply/discharge tube 76 and the lower supply/discharge tube 77 protrude rearward (left direction in FIG. 2) or obliquely rearward/downward (lower direction in FIG. 5) from an outer side surface of the housing 42 with respect to the vehicle.

In the above-described fuel cell system 10 and the fuel cell vehicle, pressure chamber (50 and 52) side opened ends of the upper supply/discharge tube 76 and the lower supply/discharge tube 77 are obliquely cut with respect to the axial directions of the upper supply/discharge tube 76 and the lower supply/discharge tube 77 in each of the inlet shutoff valve 20, the outlet shutoff valve 22, and the humidifier bypass valve 18. Therefore, the entire length of a circumferential peripheral portion of the pressure chamber (50 and 52) side opened end of respective supply/discharge tubes 76 and 77 can be increased. Accordingly, the pressure chamber (50 and 52) opening area of respective supply/discharge pipes 74 and 77 can be increased compared to a structure wherein the pressure chamber (50 and 52) side opened end of the tubelike member is not obliquely cut with respect to the axial direction (cut into a simple circular shape). With this shape, adhering of water to the pressure chamber (50 and 52) side opened end can be prevented due to surface tension acting thereon. As a result, the operational performance of the inlet shutoff valve 20, the outlet shutoff valve 22, and the humidifier bypass valve 18 can be improved.

Each of the valves 20, 22, and 18 includes a flow path forming pressure chamber 56 forming a flow path in the valve (refer to FIG. 2), a valve-closing pressure chamber 50, and a valve-opening pressure chamber 52, wherein a upper supply/discharge tube 76 and lower supply/discharge tube 77 through which gas is supplied to and discharged from the pressure chambers 50 and 52 are provided in the valve-closing pressure chamber 50 and the valve-opening pressure chamber 52 via. The drive shaft 60 constituting the valve member 58 is subjected to a force corresponding to a pressure difference between the valve-closing pressure chamber 50 and the valve-opening pressure chamber 52. Therefore, respective valves 20, 22, and 18 can prevent pressure variations in the flow path forming pressure chamber 56 due to valve opening/closing operations from influencing the operation of the drive shaft 60. In this manner, the operational performance of the respective valves 20, 22, and 18 can be improved.

Furthermore, the pressure chamber (50 and 52) side opened end of holes of the upper supply/discharge tube 76 and the lower supply/discharge tube 77 are positioned higher, in the direction of gravity, than the lowest point of the inner surface of the housing 42 constituting respective pressure chambers 50 and 52. Therefore, even when water is present in the valve-closing pressure chamber 50 and the valve-opening pressure chamber 52, the valve according to the present embodiment can prevent the water from adhering on opened end peripheral portions of the holes of the upper supply/ discharge tube 76 and the lower supply/discharge tube 77. Therefore, the valve can prevent the water adhering on the opening edge portions of the holes of respective supply/discharge tubes 76 and 77 from freezing and can prevent the ice from narrowing or closing off the openings of the holes. In this respect, the operational performances of respective valves 20, 22, and 18 can be improved.

Moreover, in respective valves 20, 22, and 18, the pressure chamber (50 and 52) side opened ends of the upper supply/discharge tube 76 and the lower supply/discharge tube 77 protrude inward from the inner surfaces of the pressure chambers 50 and 52. Therefore, the valve according to the present embodiment can prevent water (e.g., condensation) adhering on the wall surface of the pressure chambers 50 and 52 from flowing into the periphery of the pressure chamber (50 and 52) side opened ends of respective supply/discharge tubes 76 and 77. Therefore, the valve can prevent the water adhering on the edge portions of respective supply/discharge tubes 76 and 77 from freezing and can prevent the ice from narrowing or blocking the openings of respective supply/discharge tubes 76 and 77. In this respect, the operational performances of respective valves 22, 20, and 18 can be improved.

The fuel cell vehicle according to the present embodiment includes the fuel cell stack 12, the outlet shutoff valve 22, the inlet shutoff valve 20, and the humidifier bypass valve 18. In respective valves 22, 20, and 18, the upper supply/discharge tube 76 and the lower supply/discharge tube 77 are positioned behind the housing 42 constituting respective valves 22, 20, and 18 as seen from the vehicle front side to the vehicle rear side (from right side to left side in FIG. 2, and from upper side to lower side in FIG. 5). Therefore, the housing 42 having a higher rigidity compared to respective supply/discharge tubes 76 and 77 can prevent the supply/discharge tubes 76 and 77 from colliding with a foreign substance (e.g., snow or a bouncing stone) coming from the front side of the vehicle when the fuel cell vehicle is in motion. Therefore, the configuration of the present embodiment can prevent the supply/discharge tubes 76 and 77 each having a relatively low rigidity from being broken or deformed and can further improve the operational performance of the respective valves 22, 20, and 18.

Second Embodiment of the Invention

Figure 7:
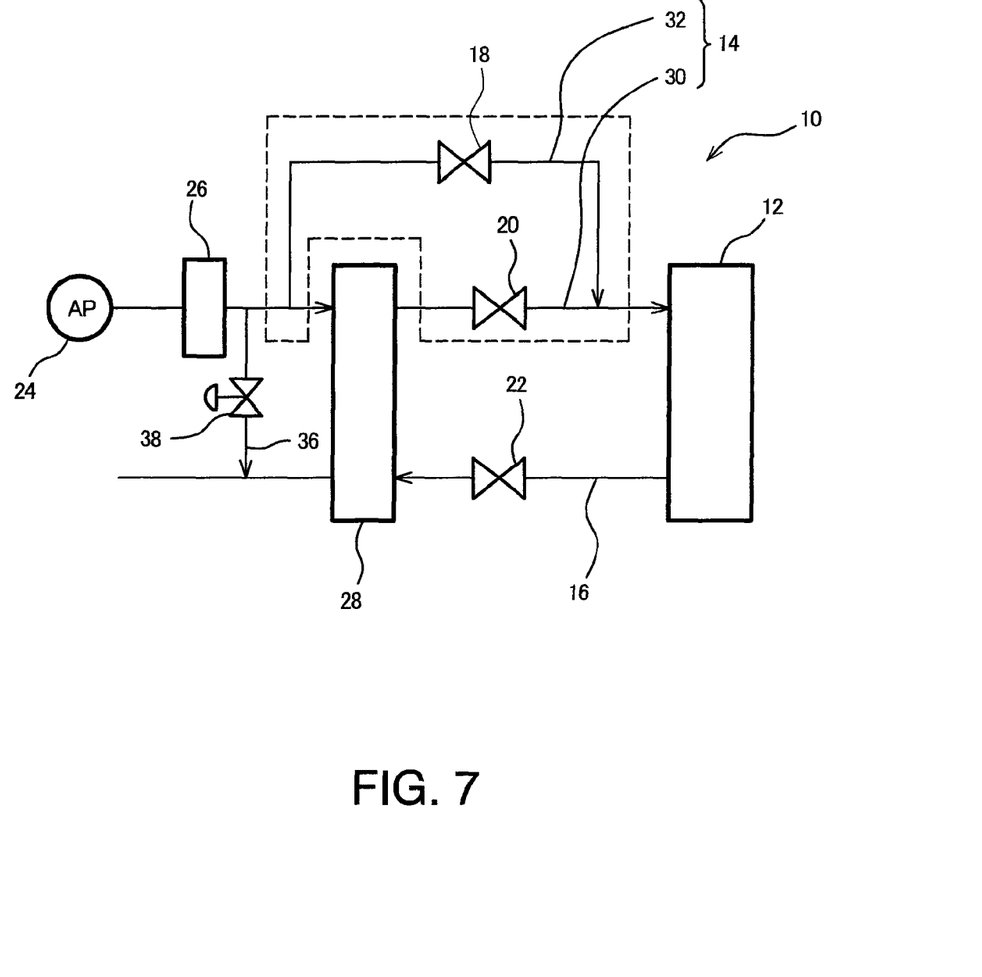
FIG. 7 illustrates a fuel cell system including a valve for a fuel cell according to a second embodiment of the present invention, which is more simplified compared to the system illustrated in FIG. 1.
Figure 8:
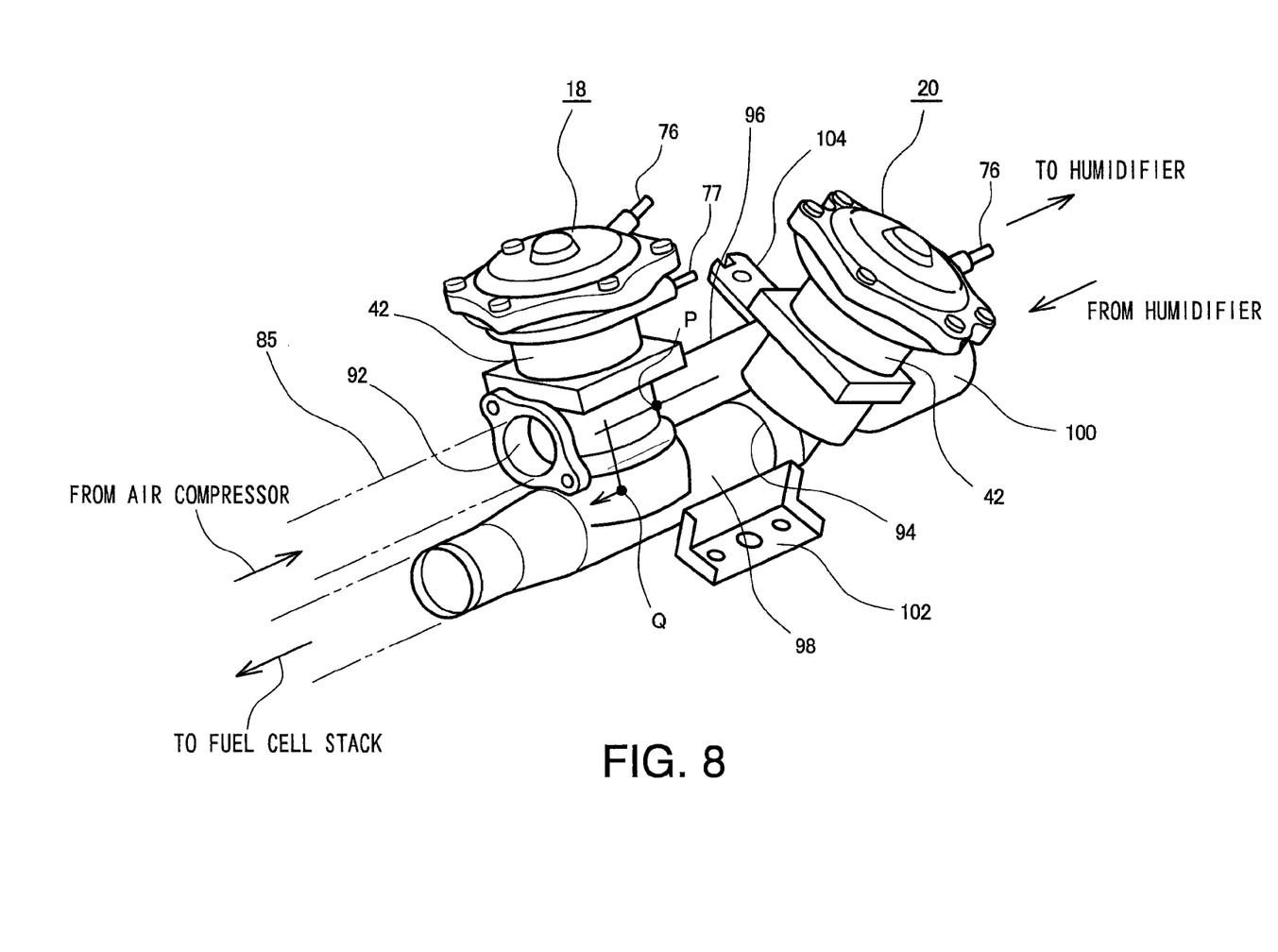
FIG. 8 is a perspective view illustrating a structure integrating an inlet shutoff valve and a humidifier bypass valve, which can be used as the valve for a fuel cell in the fuel cell system illustrated in FIG. 7.

FIGS. 7 and 8 illustrate a second embodiment of the present invention. FIG. 7 illustrates a fuel cell system including a valve for a fuel cell according to the second embodiment, which is simplified compared to the system illustrated in FIG. 1. In the present embodiment, the pipe in a region indicated by a dotted line illustrated in FIG. 7, which includes the humidifier bypass valve 18 and the inlet shutoff valve 20 as described in the above-described first embodiment, is made of a metallic pipe. The humidifier bypass valve 18 and the inlet shutoff valve 20 are integrally united together with the metallic pipe. The united portion is described in more detail with reference to FIG. 8.

FIG. 8 is a perspective view illustrating a detailed structure of the united portion indicated by the dotted line in FIG. 7. In the present embodiment, the drive shaft 60 (refer to FIG. 2) constituting the valve member 58 of the humidifier bypass valve 18 is disposed in the vertical direction and is not inclined with respect to the vertical direction. The drive shaft 60 can be driven in the vertical direction. Accordingly, the housing 42 constituting the humidifier bypass valve 18 (FIG. 8) has a body portion entirely extending in the vertical direction so as to surround the outer cylindrical surface of the drive shaft 60 (refer to FIG. 2).

The inlet 92 of the humidifier bypass valve 18 is connected to the pipe 85 positioned on the air compressor 24 (FIG. 7) side. A first outlet (corresponding to a point P position illustrated in FIG. 8), communicating with the inlet 92 regardless of an operation of the drive shaft 60 (refer to FIG. 2) constituting the valve member 58, is connected to a metallic first pipe 96 communicating with the inlet of the humidifier 28 (FIG. 7).

A second outlet (corresponding to a point Q position illustrated in FIG. 8) of the humidifier bypass valve 18 is connected to a second metallic pipe 98 communicating with the outlet 94 of the inlet shutoff valve 20. The second outlet of the humidifier bypass valve 18 can be selectively connected to or disconnected from the inlet 92 according to a movement of the drive shaft 60 (refer to FIG. 2). A metallic third pipe 100 is connected to the inlet 92 (refer to FIG. 2) of the inlet shutoff valve 20. The inlet shutoff valve 20 is connected with the humidifier bypass valve 18 only via the second metallic pipe 98 and is not connected via a rubber pipe. The fixing brackets 102 and 104 are fixed to the metallic pipe (the first pipe 96 and the second pipe 98 in the illustrated example). The fixing brackets 102 and 104 can be used to fix the pipe to a vehicle body (not illustrated) using bolts or the like. One of the two fixing brackets 102 and 104 may be omitted.

In the present embodiment, the humidifier bypass valve 18 and the inlet shutoff valve 20 (two different valves) are connected via the second metallic pipe 98. Therefore, employing the configuration according present embodiment makes it possible to improve the thermal conductivity of a portion including two valves 18 and 20, compared to a case where the two valves 18 and 20 are connected only via a rubber pipe. When the fuel cell stack 12 (FIG. 7) is in an operative state, the temperature of the fuel cell stack 12 increases. Therefore, the humidifier bypass valve 18 and the inlet shutoff valve 20 are connected via the metallic pipes 96, 98, and 100 so as to improve the thermal conductivity of a region including the valves 18 and 20 and a member connected to respective valves 18 and 20 via the pipes 96, 98, and 100. Therefore, the temperature of the humidifier bypass valve 18 and the temperature of the inlet shutoff valve 20 can be quickly increased. As a result, even if water is present in the pressure chambers of the valves 18 and 20, the configuration according to the present embodiment can prevent the water from freezing on the valve member 58, on the valve seat 81 (refer to FIG. 2), or on a sliding portion of the valve member 58 when the valves are used in a low temperature (below the freezing point of water) environment. The configuration according to the present embodiment can prevent the operability of the valve member 58 from deteriorating in the humidifier bypass valve 18 and the inlet shutoff valve 20. More specifically, the configuration of the present embodiment can further improve the operational performance of these valves 18 and 20.

Two valves 18 and 20 can be handled as an integrated unit. The present embodiment does not require any fixing brackets to fix the two valves 18 and 20 to the vehicle body, other than the fixing brackets 102 and 104 fixed to the pipes 96 and 98. Moreover, compared to configuration wherein a rubber pipe is employed, the present embodiment does not require any fastening member (e.g., clamp) to be used to fasten the rubber pipe, or can reduce the number of fastening members required. Therefore, the present embodiment can reduce both the weight and cost of the device and can the number of man-hours required to install the valves in the vehicle.

In other aspects, the configuration and functions are similar to those described in the first embodiment. Similar portions are denoted by the same reference numerals and will not be described again. The structure for connecting two valves via a metallic pipe according to the present embodiment is not limited to a fuel cell system and can be applied to any other system.

The valve for a fuel cell according to the present invention is not limited to the above-described inlet shutoff valve 20, the outlet shutoff valve 22, and the humidifier bypass valve 18, which are cathode side valves operable to disconnect or connect a path in which the oxidizing gas system gas flows. For example, the valve for a fuel cell according to the present invention can be applied to an anode side valve that disconnects or connects a flow path in which the hydrogen gas (fuel gas system gas) flows.

INDUSTRIAL APPLICABILITY

The present invention is applicable to a valve for a fuel cell and a fuel cell vehicle. For example, the valve for a fuel cell according to the present invention can be installed on a vehicle body as a fuel cell for a vehicle. The fuel cell stack can be used for a fuel cell system that can serve as a power source for the vehicle traction motor.

What is claimed is:

1. A fuel cell vehicle comprising:
   a fuel cell that generates electricity through an electrochemical reaction between an oxidizing gas and a fuel gas, and
   a valve for the fuel cell that disconnects or connects between an upstream side and a downstream side of a flow path via which the oxidizing gas or the fuel gas is supplied to the fuel cell or via which the oxidizing gas or the fuel gas is discharged from the fuel cell,
   wherein the valve for the fuel cell comprises:
   a housing;
   a first pressure chamber and a second pressure chamber provided in the housing;
   two supply/discharge tubes connected to the housing, and supplying and discharging fluid to and from the first pressure chamber and the second pressure chamber, respectively;
   a drive shaft supported by the housing, and movable in its axial direction when subjected to a force corresponding to a pressure difference between the first pressure chamber and the second pressure chamber;
   a valve member body fixed to the drive shaft; and
   a flow path forming pressure chamber extending from an inlet portion to an outlet portion opened on the housing,
   wherein the flow path forming pressure chamber is disconnected or connected in response to a displacement of the valve member body according to a movement of the drive shaft in its axial direction, and
   wherein at least one supply/discharge tube of the two supply/discharge tubes is positioned straight behind the housing constituting the valve for the fuel cell as seen from a front side to a rear side of the vehicle along its longitudinal direction.

2. The fuel cell vehicle according to claim 1,
   wherein the drive shaft is supported by the housing and is movable in an oblique direction with respect to a vertical direction of the housing.

3. The fuel cell vehicle according to claim 2,
   wherein a portion of the housing that covers an outer periphery and an upper end of the drive shaft is inclined with respect to a vertical direction and a front side edge of an upper surface of the housing is positioned higher than a rear side edge of the upper surface of the housing.

4. The fuel cell according to claim 1,
   wherein both of the two supply/discharge tubes are positioned straight behind the housing constituting the valve for the fuel cell as seen from the front side to the rear side of the vehicle along its longitudinal direction.

5. The fuel cell according to claim 3,
   wherein the draft shaft is supported to be movable with respect to the housing in a direction that is rearwardly inclined toward above, and
   wherein the portion of the housing that covers the outer periphery and the upper end of the drive shaft is inclined rearwardly toward above, and the front side edge of an upper surface of the housing is positioned higher than a rear side edge of the upper surface of the housing.

* * * * *